H. REICHMAN.
AUTOMOBILE CHAIN TIGHTENING AND RELEASING TOOL.
APPLICATION FILED MAY 3, 1915.

1,179,456.

Patented Apr. 18, 1916.

Witnesses
Ed. R. Lusby
A.B.Clark

Inventor
Harry Reichman
By David P. Moore
Attorney

UNITED STATES PATENT OFFICE.

HARRY REICHMAN, OF CHAMPAIGN, ILLINOIS.

AUTOMOBILE-CHAIN TIGHTENING AND RELEASING TOOL.

1,179,456. Specification of Letters Patent. Patented Apr. 18, 1916.

Application filed May 3, 1915. Serial No. 25,439.

*To all whom it may concern:*

Be it known that I, HARRY REICHMAN, a citizen of the United States, residing at Champaign, in the county of Champaign and State of Illinois, have invented certain new and useful Improvements in Automobile-Chain Tightening and Releasing Tools, of which the following is a specification, reference being had therein to the accompanying drawing.

This invention relates to an automobile chain tightening and releasing tool, one object of the invention being the provision of a tool of this character by means of which the anti-skid chains generally employed about automobile pneumatic tires may be easily and quickly manipulated so that the locking ends thereof may be connected or disconnected without the usual trouble when handled by hand, and whereby the chain when once positioned will be in such tightened relation that it will not slip, or creep during the tractive force of the machine.

A further object of the present invention is the provision of a novel construction of pliers that is provided with chain receiving and holding means whereby the respective ends of the chain may be readily and quickly placed in position for drawing toward each other during the connection of such ends and the tightening and placing of the chain about the tire.

With the foregoing and other objects in view, the present invention resides in novel features of construction and combination of parts as particularly claimed.

Figure 1:
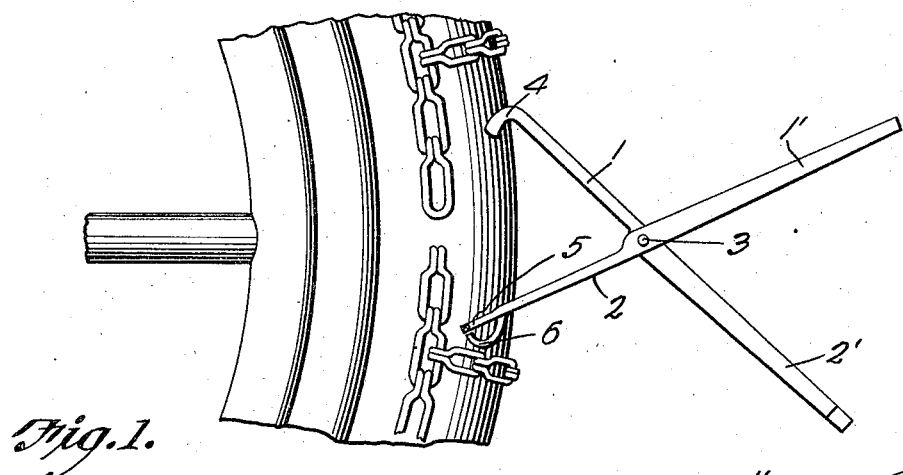
Figure 2:
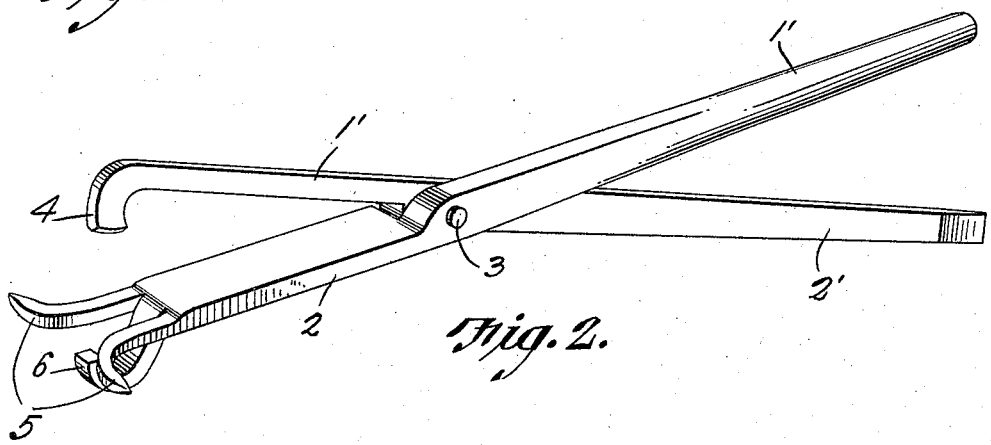

In the accompanying drawings:—Figure 1 is a view demonstrating the use of the present invention. Fig. 2 is a perspective view of one form of the present invention *per se*.

Referring to the drawings, the numeral 1 designates one member of the tool as shown in Figs. 1 and 2, and 2 designates the other member, such members being pivotally connected as at 3, and thus providing the respective operating handles 1' and 2'. The other end of the member 1 is provided with an inturned hook 4, while the coöperating ends of the member 2, is provided with the two outwardly extended hooks 5, and the curved hook 6, which is projected between the hooks 5 and has its free end terminating at a point below and not in the same plane as the hooks 5. Thus with the two chain engaging ends, the locking ends of the antiskidding chain after being placed about the pneumatic tire, may be drawn tightly and with ease toward each other to permit of the tightening and locking of the chain in place. To release and remove the chain the reverse operation is resorted to.

From the foregoing description it is evident that with a tool of this character that an anti-skidding chain may be easily positioned and removed whether the tire be muddy or whether the chain itself is muddy and clogged, thus providing a tool which can be readily carried by all motorists among the various other tools.

What I claim, as new, is:—

An antiskid chain tightener and releaser, including a pair of pliers, the operating end of one of the members of which is provided with a single inwardly projecting link receiving hook, while the coöperating end of the other member is provided with two spaced L-shaped outwardly projecting hooks, and a central hook disposed below and adjacent to the space between the L-shaped hooks.

In testimony whereof I affix my signature in presence of two witnesses.

HARRY REICHMAN.

Witnesses:
GEO. O. NORTH,
R. S. BURT.

Copies of this patent may be obtained for five cents each, by addressing the "Commissioner of Patents, Washington, D. C."